United States Patent
Jabori et al.

(10) Patent No.: US 8,667,188 B2
(45) Date of Patent: Mar. 4, 2014

(54) COMMUNICATION BETWEEN A COMPUTER AND A DATA STORAGE DEVICE

(75) Inventors: Monji G. Jabori, Houston, TX (US); Rahul Lakdawala, Cypress, TX (US); Richard Lin, Houston, TX (US); Robin Lovelace, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 72 days.

(21) Appl. No.: 13/386,258

(22) PCT Filed: Mar. 24, 2010

(86) PCT No.: PCT/US2010/028386
§ 371 (c)(1),
(2), (4) Date: Jan. 20, 2012

(87) PCT Pub. No.: WO2011/119151
PCT Pub. Date: Sep. 29, 2011

(65) Prior Publication Data
US 2012/0131236 A1    May 24, 2012

(51) Int. Cl.
*G06F 3/00* (2006.01)
*G06F 13/00* (2006.01)

(52) U.S. Cl.
USPC ............. 710/23; 710/2; 710/5; 710/8; 710/15

(58) Field of Classification Search
None
See application file for complete search history.

(56) References Cited

U.S. PATENT DOCUMENTS

| | | |
|---|---|---|
| 2005/0166014 A1 | 7/2005 | Kobayashi et al. |
| 2006/0106980 A1 | 5/2006 | Kobayashi et al. |
| 2008/0005398 A1* | 1/2008 | Huffman ................... 710/39 |
| 2008/0022026 A1 | 1/2008 | Yang et al. |
| 2008/0183921 A1 | 7/2008 | Chang et al. |
| 2009/0037689 A1 | 2/2009 | Kanuri |
| 2009/0070620 A1 | 3/2009 | Chiang et al. |
| 2009/0144453 A1 | 6/2009 | Lin et al. |
| 2009/0164698 A1 | 6/2009 | Ji et al. |
| 2009/0292865 A1 | 11/2009 | Hong |
| 2010/0011149 A1 | 1/2010 | Molaro et al. |

OTHER PUBLICATIONS

Native Command Queuing—Advance Performance in Desktop Storage, (Research Paper), vol. 24, pp. 4-7, Oct.-Nov. 2005 http://ieeexplore.ieee.org/stamp/stamp.jsp?tp=&arnumber=1549750&tag=1.

* cited by examiner

*Primary Examiner* — Scott Sun

(57) ABSTRACT

A method for communicating between a computer and a data storage device comprises receiving, by a data storage device, information indicative of a plurality of commands and information indicative of a memory location in a computer associated with each of the plurality of commands. The method further comprises executing, by the data storage device, one of the plurality of commands. In one embodiment, executing the command comprises directly accessing the computer memory location associated with the command.

16 Claims, 3 Drawing Sheets

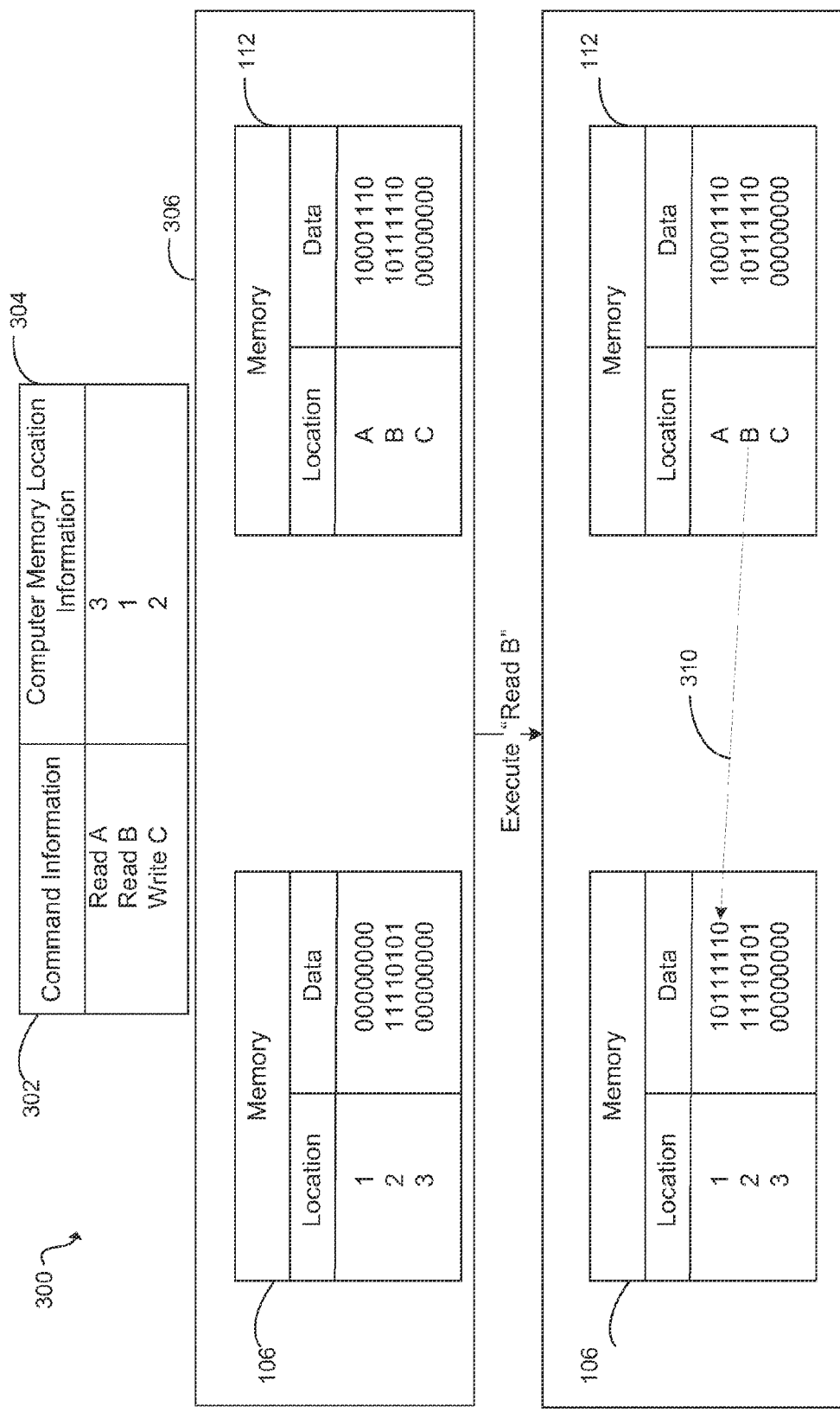

COMMUNICATION BETWEEN A COMPUTER AND A DATA STORAGE DEVICE

BACKGROUND

Computers often communicate with data storage devices, such as disk drives, in order to transfer data between the data storage device and computer. For example, desktop computers can communicate with a hard drive to access and play music files stored on the hard drive. Traditionally, a computer would send a single read or write command to a data storage device. However, protocols, such as Native Command Queuing, have been developed to allow a computer to simultaneously send multiple commands to a data storage device. In some cases, these protocols allow the data storage device to optimize the order in which the commands are executed.

Allowing the data storage device to receive a queue of commands often increases the speed at which the data is transferred, which is helpful in a variety of applications, including applications that utilize asynchronous I/O. Because there is a continual goal to create faster computers, it is desirable that new technologies take advantage of queued command protocols in order to further increase computer performance.

BRIEF DESCRIPTION OF THE DRAWINGS

In the accompanying drawings, like numerals refer to like components or blocks. The following detailed description references the drawings, wherein:

FIG. 3 is a block diagram illustrating one example of a memory update in a computing system.

DETAILED DESCRIPTION

Computers send commands to data storage devices in order to read data from the data storage device and write data to it. In some cases, queued command protocols allow the computer to simultaneously send multiple commands to the data storage device such that the data storage device then determines an order to execute the commands. Some implementations, such as those using first party direct memory access, allow the data storage device to initiate a direct memory access to the computer's memory. To do this, the data storage device may take control of the computer's host adaptor in order to direct the computer's host adaptor to access the computer's memory location associated with the command selected for execution. In order for the host adaptor to be able to determine the memory location associated with the command, the computer may in some cases store additional tables to associate each command with a computer memory location.

In one embodiment, a method for communicating between a computer and a data storage device allows the data storage device to take greater responsibility for data transfer tasks, thereby improving computer performance. For example, the data storage device may directly access the computer's memory in order to transfer data to and from the computer's memory. To enable the data storage device to directly access the proper computer memory location, the computer may send to the data storage device a list of commands to be executed and information about the computer memory location associated with each command.

Embodiments described below for communicating between a computer and a data storage device may provide advantages. For example, a data storage device that directly accesses a computer's memory may allow the computer to perform other tasks that it would not be able to perform if the computer were to perform additional memory access tasks. The memory lock resulting from the computer's host adaptor or other component performing a memory access could potentially cause the computer to wait microseconds. The computer could instead be performing other tasks, such as transferring additional data. Freeing the computer to perform other tasks would likely result in other tasks being completed more quickly, thus, increasing the computer's overall performance capabilities. Furthermore, some embodiments may eliminate the need for additional lookup tables to associate each command with a memory location. Additional embodiments and applications will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that stores executable instructions or other data (e.g., a hard disk drive, random access memory, flash memory, etc.).

Figure 1:
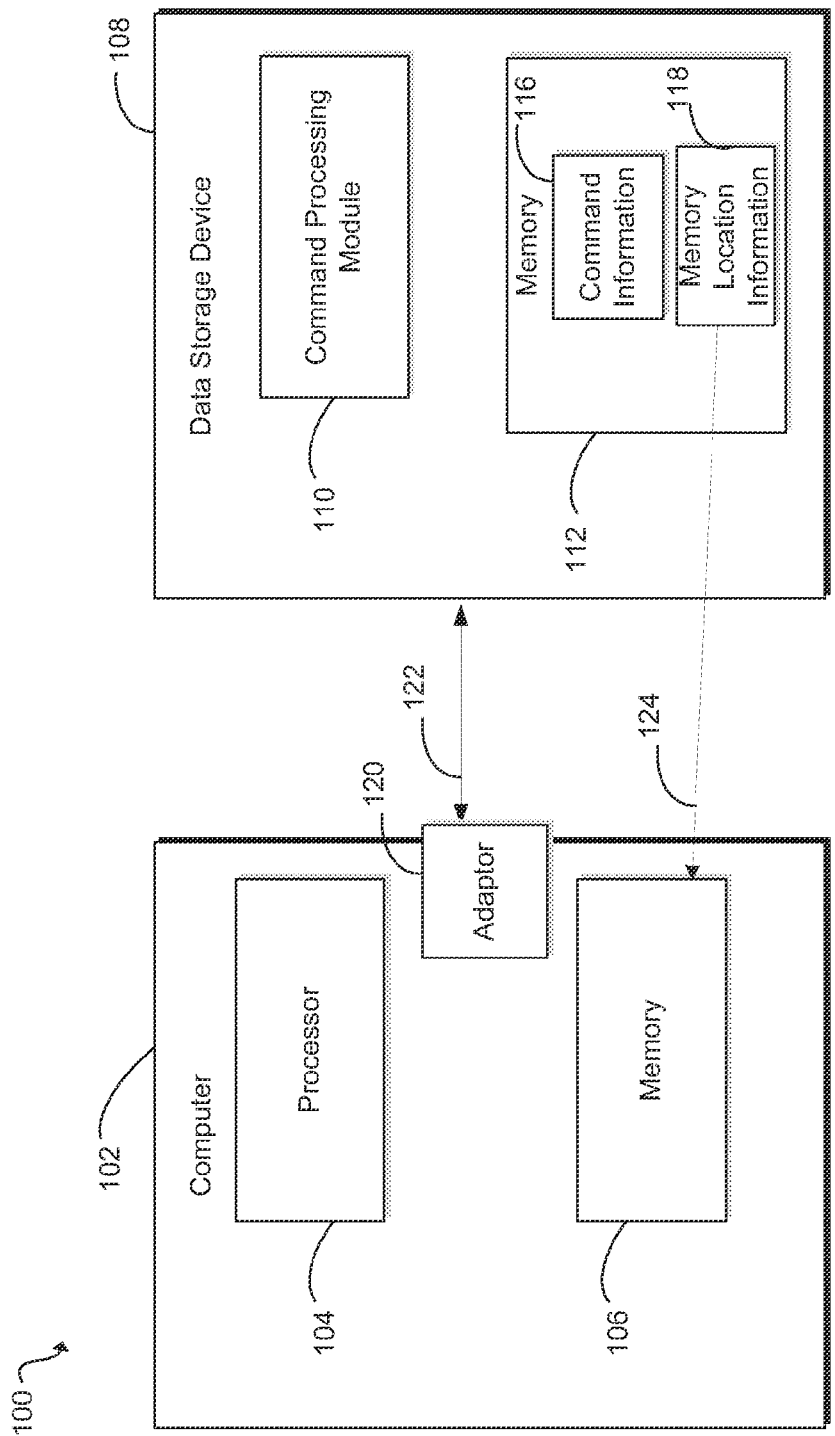
FIG. 1 is a block diagram illustrating one example of a computing system.

FIG. 1 is a block diagram illustrating one example of a computing system 100. The computing system 100 may include a computer 102, such as a desktop or notebook computer, a data storage device 108, and a bus 122. The data storage device 108 may be any suitable data storage device, for example, a non-volatile storage device, such as a disk drive. In some embodiments, the data storage device 108 is a hard disk drive or an optical disk drive.

The computer 102 and the data storage device 108 communicate, for example, via the bus 122. The bus 122 may transfer any suitable type of data, such as audio or image data, between the data storage device 108 and computer 102, and the bus 122 may be any suitable type of bus, including a Peripheral Component Interconnect (PCI), Peripheral Component Interconnect Express (PCI Express) Serial Advancement Technology Attachment (SATA), or Serial Advancement Technology Attachment 3 (SATA3) bus. In one embodiment, the computer 102 is a host computer connected to the data storage device 108. In some embodiments, the data storage device 108 is an external storage device to the computer 102.

The computer 102 includes, for example, a processor 104, a memory 106, and an adaptor 120. The computer processor 104 may be a central processing unit (CPU), a semiconductor-based microprocessor, or any other hardware device suitable for retrieval and execution of instructions stored in machine-readable storage medium. The computer processor 104 may fetch, decode, and execute instructions. In some implementations, the computer 108 may include logic, such as state machine logic, instead of or in addition to the computer processor 104. The adaptor 120 may be, for example, a host adaptor, host controller, or host bus adaptor. In one embodiment, the adaptor 120 connects the bus 122 to the computer 102. The computer memory 106 may be any memory suitable for storing information, such as random access memory.

The data storage device 108 may comprise a command processing module 110 and a memory 112. The command processing module 110 may be any hardware device suitable for retrieval and execution of instructions stored in a machine-readable storage medium. For example, the command processing module 110 may be a processor. In one embodiment, the command processing module 110 includes logic, such as state machine logic, in addition to or instead of a processor. The data storage device memory 112 may be any memory suitable for storing information, such as non-volatile memory. The data storage device memory 112 may store information about a plurality of commands, such as command information 116. The data storage device memory 112 may also store memory location information 118 associated with the command information 116. In some embodiments, the memory location information 118 stores information about a memory location in the computer memory 106, as shown by dotted line 124 demonstrating that the memory location information 118 is information about a memory location in the computer memory 106.

Figure 2:
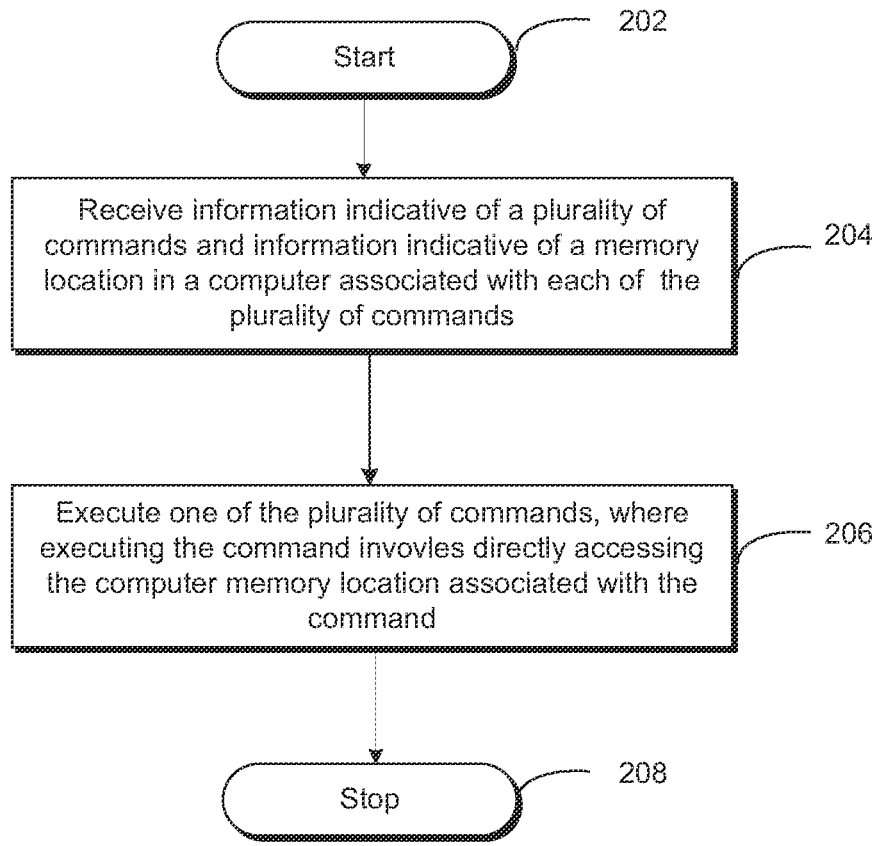
FIG. 2 is a flow chart illustrating one example of a method for communicating between a computer and a data storage device.

FIG. 2 is a flow chart illustrating one example of a method 200 for communicating between the computer 102 and the data storage device 108. In one embodiment, the method 200 allows the data storage device 108 to directly access the computer memory 106.

Beginning at a block 202, the method 200 proceeds to a block 204 where the data storage device 108 receives information indicative of a plurality of commands and information indicative of a memory location in the computer 102 associated with each of the plurality of commands. The information indicative of a command, such as the command information 116, may be any information suitable to identify a command to the data storage device 108, such as a command to read data from the data storage device 108 or a command to write data to the data storage device. In one embodiment, the information indicative of the commands are the Read FPDMA and Write FPDMA commands used in the Native Command Queuing protocol. The information indicative of a memory location in the computer 102, for example the memory information 118, may be any information capable of being used to identify a location in the computer memory 106.

The data storage device 108 may receive the information, for example, from the computer 102. In one embodiment, the computer 102, using the computer processor 104, allocates a location in the computer memory 106 for each of the plurality of commands. The computer 102 may then send information about each of the commands and the location in the computer memory 106 allocated for each of the commands, such as by sending the memory table as part of the transferred command block. For example, the computer 102 may allocate memory in the computer memory 106 location X for receiving information read from a memory location Y in the data storage device memory 112. The computer 102 may then send to the data storage device 108 a command to read information from the memory location Y in the data storage device memory 112 and the associated memory location X information for the location in the memory 106 that was allocated for the command. The computer 102 may use the adaptor 120 to send the information across the bus 122. In one embodiment, the computer 102 also sends an identifier or tag associated with each of the commands that may be used to identify a particular command to both the computer 102 and the device 108.

Moving to a block 206, the data storage device 108 executes one of the plurality of commands, where executing the command involves directly accessing the computer memory 106 location associated with the command. To directly access the computer memory 106 location, the data storage device 108 may itself access the computer memory 106 without controlling the adaptor 120 to perform the memory access. The data storage device 108, such as by using the command processing module 110, may directly access the computer memory 106 by directly reading or directly writing data to a memory location in the location in the computer memory 106 associated with the command being executed. In one embodiment, directly accessing the computer memory 106 location involves the data storage device 108 performing a direct memory access (DMA) to the computer memory 106.

The computer 102 may be configured to operate in any mode suitable for allowing the data storage device 108 to directly access the computer memory 106. In some embodiments, the adaptor 120 operates in a pass through mode to allow the data storage device 108 to access the computer memory 106. The data storage device 108 may directly access the memory 106 without the intervention of the adaptor 120. In some embodiments, the adaptor 120 has some involvement in the data transfer process, but the data storage device 108 directly reads or writes information to the computer memory 106 without the adaptor 120 performing the memory access.

In one embodiment, the command processing module 110 executes instructions stored in a machine-readable storage medium that instruct the data storage device 108 to directly access the computer memory 106. The data storage device 108 may determine the location to directly access the computer memory 106 based on the information received indicative of the association of each command with a memory location in the computer memory 106. In some embodiments, the data storage device 108 accesses the computer memory 106 in connection with the execution of each command rather than accessing the computer memory 106 after the execution of a group of or all of the plurality of commands. Method 200 may then proceed to a block 208 where the method 200 may end.

Some reordering protocols, such as the Native Command Queuing (NCQ) and Tagged Command Queuing (TCA) protocols, allow a data storage device to receive a queue of commands and determine the order to execute the commands. Native Command Queuing, for example, allows a data storage device to determine the order to execute commands based on the most efficient sector access. In one embodiment, the data storage device 108, for example using the command processing module 110, determines an order to execute the received list of commands. The data storage device 108 may use any suitable method for determining the order of command execution, such as the Native Command Queuing protocol. The data storage device 108 may select the command to execute based on the determined order of command execution.

In one embodiment, the data storage device 108 executes a command to read information from the data storage device computer memory 106. For example, the data storage device 108 receives information indicative of a plurality of commands and information indicative of a memory location in the computer 102 associated with each of the plurality of commands. In one embodiment, the data storage device 108 selects to execute a command to read information from the data storage device. The selection can be made based on any suitable method, for example the method used by the Native Command Queuing Protocol. The data storage device 108 may interpret the selected command to determine which location to read from the data storage device memory 112. In some embodiments, the data storage device 108 then directly writes the data read from the data storage device memory 112 to the computer memory 106 location associated with the selected command being executed.

In one embodiment, the data storage device 108 executes a command to write information to the data storage device memory 112. The data storage device 108 may receive information indicative of a plurality of commands and information indicative of a memory location in the computer 102 associated with each of the plurality of commands. The data storage device 108 may select a command to execute. In some embodiments, the data storage device, using the command processing module 110, determines an order to execute the commands, such as using a reordering protocol, and selects which command to execute based on the determined order. When the data storage device 108 is ready to execute the selected write command, the data storage device 108 may, for example, directly read data from the computer memory 106 location associated with the command selected for execution. In one embodiment, after the data storage device 108 reads the data in the computer memory 106 location, the data storage device 108 writes the data read from the computer memory 106 to the data storage device memory 112.

FIG. 3 is a block diagram 300 illustrating one example of a memory update in a computing system. The data storage device 108 may receive information indicative of a plurality of commands, such as command information 302, and information indicative of a memory location in the computer 102, such as the computer memory location information 304, associated with each of the plurality of commands. A block 306 illustrates the computer memory 106 and the data storage memory 112 where both are populated with some example data values.

The data storage device 108 may select one of the plurality of commands represented by the command information 302. For example, as shown in FIG. 3, the data storage device 108 may select to execute the command "Read B". The computer memory location information 304 shows the command information 302 for "Read B" is associated with the computer memory 106 location 1. A block 308 illustrates the computer memory 106 and the data storage device memory 112 after the data storage device 108 executes the command "Read B". To execute the command, the data storage device 108 may directly access the computer memory 106 to write the value stored in the data storage device memory 112 in the location B to the computer memory 106 location associated with the "Read B" command. For example, as shown by the dotted line 310, the data storage device 108 may write the value "10111110" read from the location B in the data storage memory 112 to the computer memory 106 location 1 that was associated with the "Read B" command. After executing the "Read B" command, the data storage device 108 may select to execute the "Read A" or "Write C" commands found in the command information 302.

Some embodiments of a method of communicating between a computer and a data storage device are discussed above, but other embodiments of the method are also contemplated. Embodiments provide many important advantages. For example, some embodiments allow a computer, including the computer's adaptor, to transfer additional data or perform other tasks simultaneously while the data storage device directly accesses the computer's memory. As a result, the computer's overall performance is faster and more efficient. Additionally, the number of lookup tables and transactions used for a data transfer may be decreased by allowing the data storage device to receive information about the computer memory locations associated with each command to be executed by the data storage device. Some embodiments take advantage of queued command systems by allowing the computer to have a more passive role in the data transfer operations once the computer sends the command information to the data storage device.

The invention claimed is:

1. A method for communicating between a computer and a data storage device comprising:

receiving, by a data storage device, information indicative of a plurality of commands and information indicative of respective memory locations in a computer associated with respective ones of the plurality of commands; and executing, by the data storage device, one of the plurality of commands, wherein executing the command comprises, by the data storage device, directly accessing the respective computer memory location associated with the command.

2. The method of claim 1, wherein directly accessing the computer memory location comprises performing a direct memory access to the computer memory location.

3. The method of claim 1, wherein the data storage device directly accesses the computer memory location without the intervention of the computer.

4. The method of claim 1, further comprising determining an order to execute the plurality of commands.

5. The method of claim 4, wherein determining an order to execute the plurality of commands comprises using the Native Command Queuing protocol.

6. A machine-readable storage medium encoded with instructions executable by a data storage device, the machine-readable medium comprising:

instructions for the data storage device receiving information indicative of a plurality of commands and information indicative of respective memory locations in a computer associated with respective ones of the plurality of commands;

instructions for the data storage device selecting one of the plurality of commands, wherein the selected command is a command to read data from the data storage device memory;

instructions for the data storage device reading data associated with the selected command from the data storage device memory; and instructions for the data storage device directly writing the read data to the computer memory location indicated by the received memory location information associated with the selected command.

7. The machine-readable storage medium of claim 6, wherein instructions for directly writing the data to the computer memory location comprise instructions for performing a direct memory access to the computer memory location.

8. The machine-readable storage medium of claim 6, wherein instructions for directly writing the data to the computer memory location comprise instructions for directly writing data to the computer memory location without the intervention of the computer.

9. The machine-readable storage medium of claim 6, wherein instructions for selecting one of the plurality of commands comprise instructions for using the Native Command Queuing protocol to select one of the plurality of commands.

10. A computing system, comprising:
a computer comprising:
a memory for storing data; and
a data storage device comprising:
a memory for storing data; and
a command processing module configured to:
receive from the computer information indicative of a plurality of commands and information indicative of respective memory locations in the computer memory associated with respective ones of the plurality of commands; and
execute one of the plurality of commands, wherein executing the command comprises, by the data storage device, directly accessing the respective computer memory location associated with the command.

11. The computing system of claim 10, wherein directly accessing the computer memory location comprises performing a direct memory access to the computer memory location.

12. The computing system of claim 10, wherein directly accessing the computer memory location comprises directly accessing the computer memory location without the intervention of the computer.

13. The computing system of claim 10, wherein the computer operates in a pass through mode to allow the command processing module to directly access the computer memory location.

14. The computing system of claim 10, wherein the command processing module is further configured to determine an order in which to execute the plurality of commands.

15. The computing system of claim 14, wherein the command processing module is configured to use the Native Command Queuing protocol to determine the order to execute the plurality of commands.

16. The method of claim 1, wherein the direct accessing of the respective computer memory location associated with the command by the data storage device is performed without an adaptor of the computer performing the accessing of the respective computer memory location.

* * * * *